United States Patent [19]

Nishi et al.

[11] Patent Number: 5,184,221
[45] Date of Patent: Feb. 2, 1993

[54] APPARATUS FOR REMOVING GHOST COMPONENT DISTURBING PICTURE SIGNAL

[75] Inventors: Yuji Nishi, Iwai; Shigehiro Ito, Toride; Tatsushi Kuguchi, Iwai; Kazuyuki Ebihara, Toride, all of Japan

[73] Assignee: Victor Company of Japan, Ltd., Yokohama, Japan

[21] Appl. No.: 783,826

[22] Filed: Oct. 29, 1991

[30] Foreign Application Priority Data

Oct. 29, 1990 [JP] Japan ................................. 2291043

[51] Int. Cl.$^5$ ............................................ H04N 5/210
[52] U.S. Cl. ..................................... 358/167; 358/905
[58] Field of Search ............. 358/167, 905, 166, 21 V, 358/36, 37, 160

[56] References Cited

U.S. PATENT DOCUMENTS

| | | | |
|---|---|---|---|
| 4,575,857 | 3/1986 | Murakami | 358/905 |
| 4,897,725 | 1/1990 | Tanaka et al. | 358/905 |
| 5,025,317 | 6/1991 | Koguchi et al. | 358/167 |
| 5,053,870 | 10/1991 | Ho et al. | 358/167 |
| 5,089,892 | 2/1992 | Koguchi et al. | 358/167 |

FOREIGN PATENT DOCUMENTS 3-198586 3/1991 Japan.

Primary Examiner—James J. Groody
Assistant Examiner—Michael H. Lee
Attorney, Agent, or Firm—Jacobson, Price, Holman & Stern

[57] ABSTRACT

An apparatus for removing a ghost component which disturbs a picture signal by means of a ghost canceling reference signal included therein. The reference signal is extracted from the picture signal and judged as to whether it has a specific level in a reference time interval. The extracted reference siganl is also judged as to whether a color burst signal is canceled. If both judgements are positive, a judgement signal is generated which allows the extracted signal to be examined how it is disturbed by the ghost component. In response to the examination, the ghost component is removed from the picture signal.

4 Claims, 3 Drawing Sheets

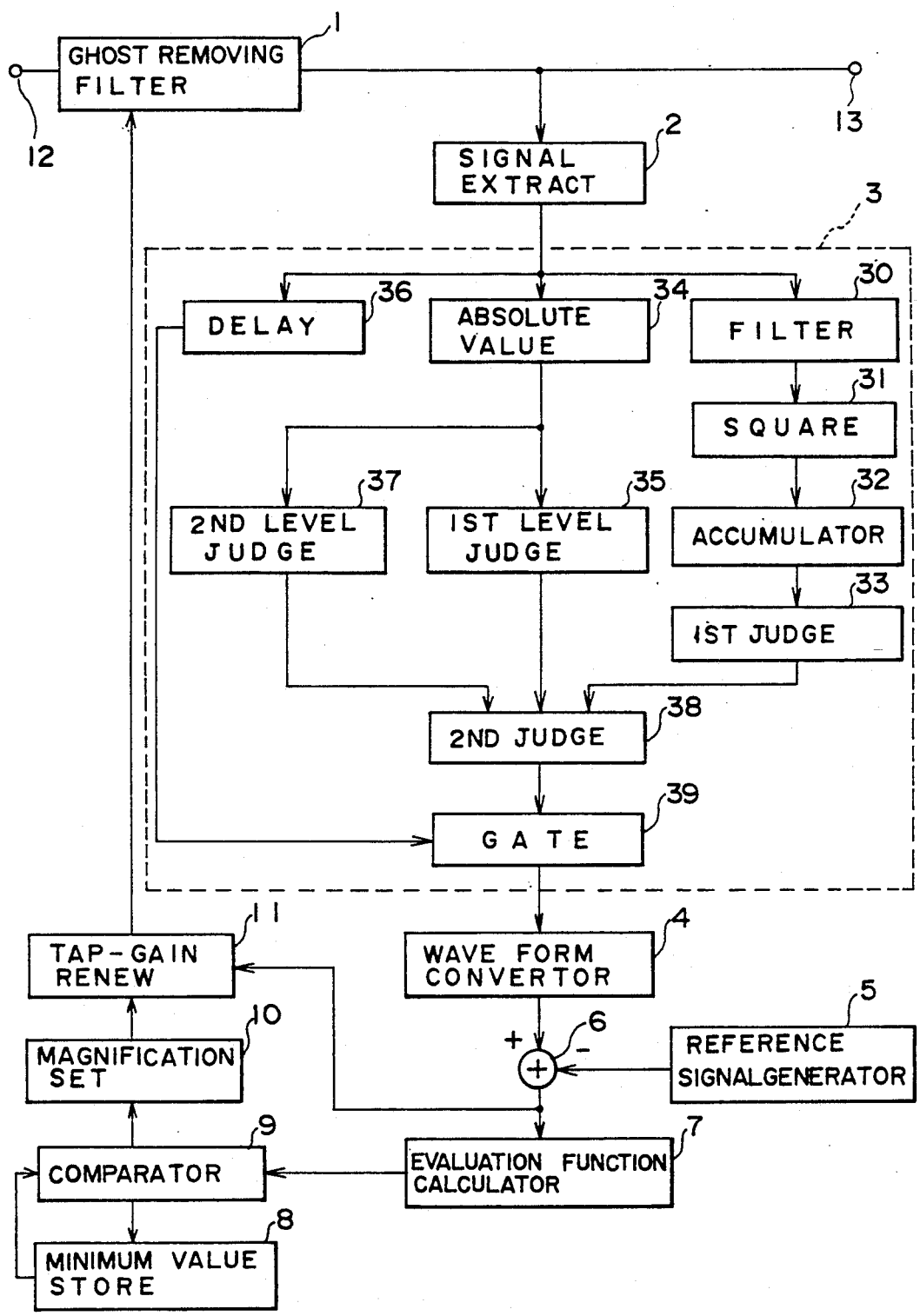
F I G. 3

APPARATUS FOR REMOVING GHOST COMPONENT DISTURBING PICTURE SIGNAL

BACKGROUND OF THE INVENTION

The present invention relates to an apparatus for removing ghost components which intermix into a received picture signal.

A picture signal includes a reference signal having GCR (Ghost Canceling Reference) signals which are extracted therefrom for removing the ghost components at a receiver side.

The GCR signals are usually rectangular pulse signals, that is, bar signals obtained by canceling a horizontal synchronizing signal and color burst signal as shown in FIGS. 1(a) and 1(b).

When extracting the GCR signals from the picture signal, the color burst signal may remain in the GCR signal, as shown in FIG. 1(c), as a component Ba, due to jitter included in the received picture signal, disturbance of the picture signal by such as scene change at TV broadcasting station side, disturbance of clock signals in the apparatus due to impulse noise and ghost, and the like.

In a conventional apparatus, the GCR signal shown in FIG. 1(c) is applied to a bandpass filter which allows a color subcarrier component of around 3.58 MHz to pass through for reducing the effect of a preceding ghost component. The bar signal is judged as to whether the remaining component Ba can be regarded as canceled while a first reference timing signal has a low level as shown in FIG. 1(d). The bar signal is further judged as to whether it has a level of a correct GCR signal while a second reference timing signal has a low level as shown in FIG. 1(e). If both judgements are positive, the bar signal is judged to be the correct GCR signal.

The conventional apparatus, however, sometimes misjudges that a bar signal out of a right timing is the correct GCR signal. For example, the bar signal shown in FIG. 1(f), which is out of a right timing compared with the GCR signal shown in FIG. 1(a), is judged to be correct because there is no color burst signal and the level of the bar signal is correct during the law level of FIG. 1(e).

SUMMARY OF THE INVENTION

An object of the present invention is to provide an apparatus which can judge whether a bar signal such as shown in FIG. 1(f) is a correct GCR signal even if it is out of the right timing.

According to the present invention there is provided an apparatus for removing a ghost component which disturbs a picture signal by means of a ghost canceling reference signal included therein, including ghost removing filter means for removing the ghost component, signal extracting means for extracting the reference signal from the picture signal by canceling a color burst signal and other signal components included therein except the reference signal, waveform judging means for judging whether the extracted reference signal has a specific waveform, signal inspection means for inspecting specific waveform, signal inspection means for inspecting disturbance of the extracted reference signal suffered from the ghost component, if the extracted reference signal is judged to have the specific waveform and characteristic varying means, responsive to the inspection, for varying filtering characteristics of the filter means, wherein the waveform judging means comprises level judging means for judging whether the extracted reference signal has a specific waveform and reference time interval, signal judging means for judging whether the color burst signal is canceled in the extracted reference signal, signal outputting means for outputting a judgement signal if the extracted reference signal is judged to have the specific level in the reference time interval and the color burst signal is judged to be canceled and gate means, responsive to the judge signal, for applying the extracted reference signal to the signal inspection means.

The other objects and features of this invention will become understood from the following description with reference to the accompanying drawings.

BRIEF DESCRIPTION OF DRAWINGS

FIGS. 2(a) to 2(n) is a view showing waveforms of signals handled in the present invention; and FIG. 3 is a block diagram of a preferred embodiment according to the present invention.

DETAILED DESCRIPTION OF PREFERRED EMBODIMENT

Reference signals for canceling a ghost component are, for example, inserted at 18th and 281th horizontal scanning periods during vertical blanking periods of a picture signal in the NTSC system.

Figure 2:
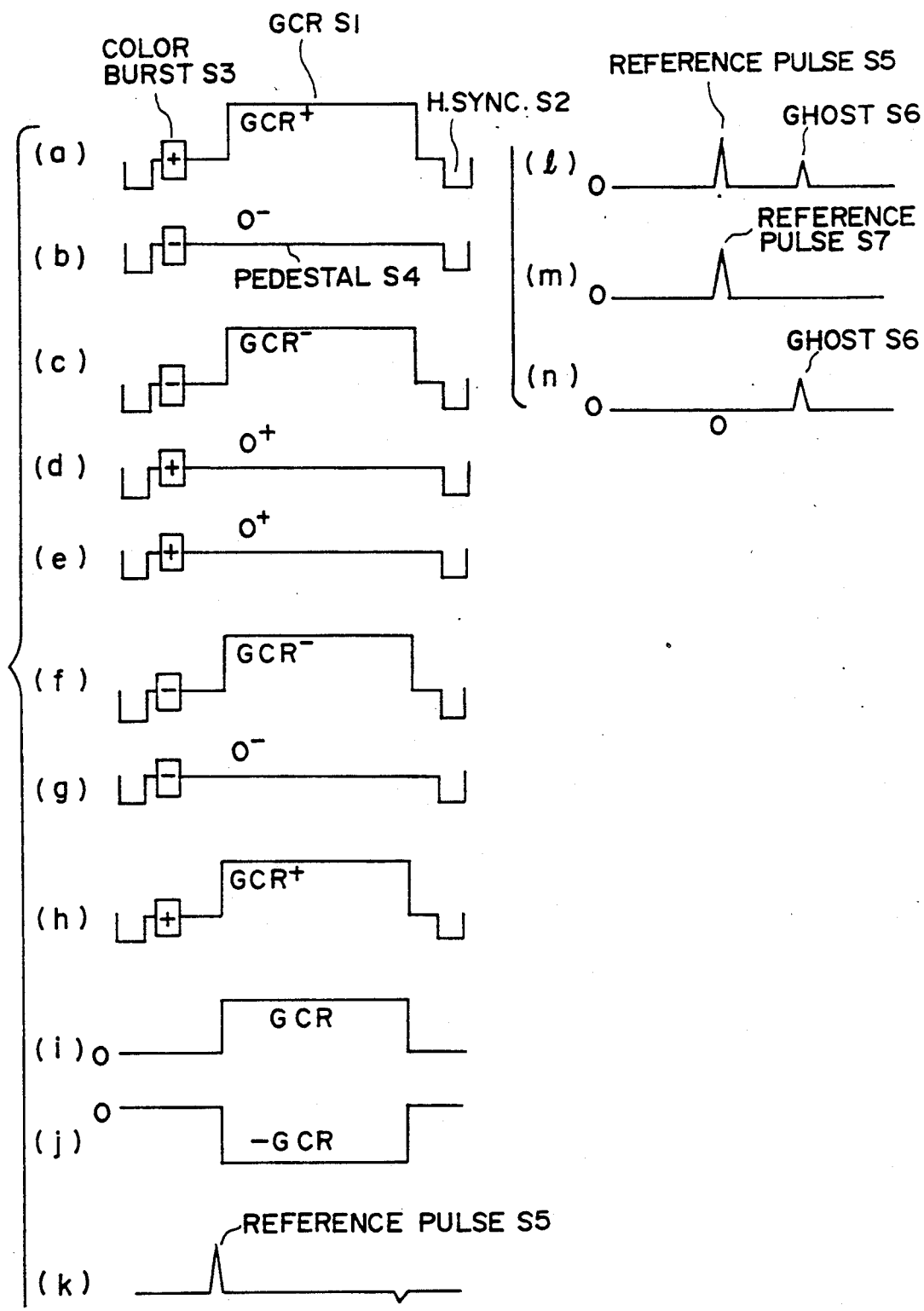
FIG. 2 comprising

The reference signal comprises GCR signals S1 and pedestal signals S4 respectively added to the picture signal per field. Both GCR and pedestal signals are inserted into the picture signal as GCR+, GCR−, O+ and O− as shown n in FIGS. 2(a) to 2(h) where "0" depicts the signal and "+" and "−" depict polarities of the color burst signals S3 in horizontal scanning periods where the GCR+, GCR−, 0+ or 0− signals exist and repeat with a repetition period of eight fields. FIGS. 2(a), (c), 2(e) and 2(g) show signals in odd fields, such as the first, third, fifth and seventh fields, while FIGS. (b), 2(d), 2(f) and 2(h) in even fields, such as the second, fourth, sixth and eighth fields.

The GCR+ signals are inserted into the first and eighth fields, and the GCR− signals the third and sixth fields, while the pedestal signals 0+ are inserted into the fourth and fifth fields, and the pedestal signals 0− the second and seventh fields.

The GCR+ and GCR− signals of bar waveforms are actual reference signals for canceling ghost components, while pedestal signals 0+ and 0− are supplement signals for respectively extracting the GCR+ and GCR− signals by canceling horizontal synchronizing signals S2 and the color burst signals by subtraction.

By respective subtraction between waveforms shown in FIGS. 2(a) and 2(e), 2(b) and 2(f), 2(c) and 2(g), and (d) and 2(h), GCR and -GCR signals respectively shown in FIGS. 2(i) and 2(j) are obtained, where the horizontal synchronizing signal and the color burst signal are canceled.

The signals shown in FIGS. 2(i) and 2(j) are differentiated to produce pulse signals shown in FIG. 2(k), where the pulse signal extracted from a leading edge of the bar signal shown in FIG. 2(i) or 2(j) is employed as a reference pulse signal S5 for canceling the ghost component. The spectrum of the reference pulse signal S5 has sufficient levels over a picture signal frequency band (0 to around 4.2 MHz in the NTSC system).

As an example, ghost component S6 shown in FIG. 2(n) with the same phase of the reference signal S5 may appear. A reference pulse signal S7 shown in FIG. 2(m) which is generated in a receiver is subtracted from the signals shown in FIG. 2(l). This results in the ghost component S6 remained as an error signal s.

A delay time and an amplitude of the ghost component which disturbs the picture signal are obtained by means of the error signal ε. A tap-gain of a transversal filter is renewed on the basis of delay time and amplitude for removing the ghost component.

FIG. 3 shows a block diagram of a preferred embodiment of an apparatus for removing the ghost component according to the present invention. Signals handled in the apparatus are treated as analog signals for convenience of explanation. While, in an actual apparatus, signals sampled by a sampling frequency of 4 fsc (fsc is a subcarrier frequency of about 3.58 MHz) are used.

A picture signal into which the ghost component intermixes is applied to a ghost removing filter section 1 having a transversal filter through an input terminal 12. The picture signal the ghost component of which is removed by the filter section 1 is outputted through an output terminal 13 and is also applied to a signal extracting section 2 where specific signal components, corresponding to one scanning line per field, including a reference signal for canceling the ghost component are extracted as shown in FIGS. 2(a) to 2(h).

As explained before, by means of the extracted specific signal components, bar GCR signals are obtained as shown in FIGS. 2(i) and 2(j). The obtained bar GCR signals are then applied to a waveform check section 3.

Figure 1:
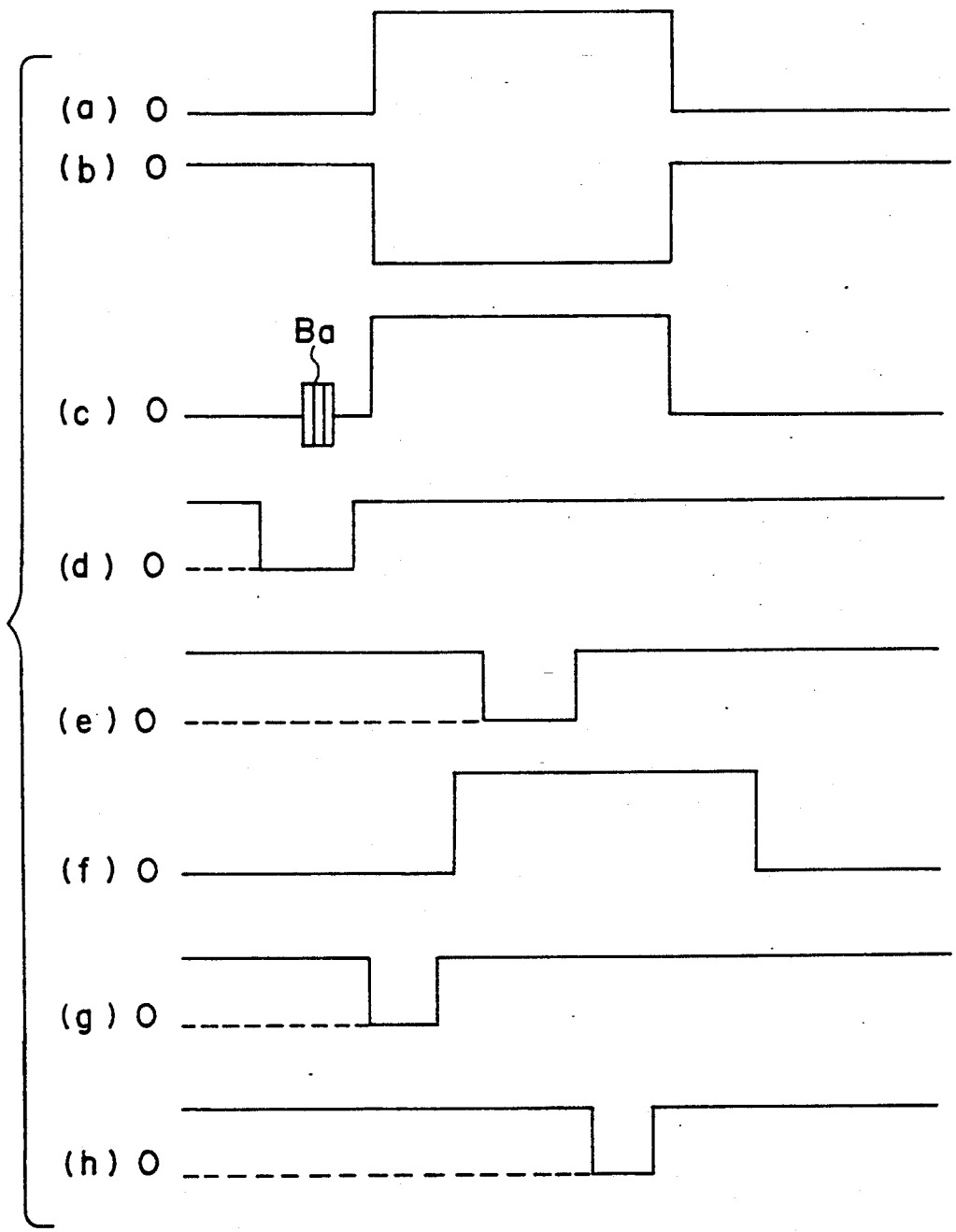
FIG. 1 comprising FIGS. 1(a) and 1)h) describes waveforms of GCR signals and reference timing signals.

The feature of the present invention is that a period of time while the level of the bar GCR signal is judged is extended. Conventionally, there is one short period of time as shown in FIG. 1(e). While, there are two periods of time in the preferred embodiment according invention as shown in FIGS. 1(g) and 1(h), to the present invention as shown in FIGS. 1(g) and 1(h), where one of the periods is to cover the bar signal after a leading edge thereof and the other before a trailing edge thereof shown in FIG. 1(c) for accelerating a judging speed. Covering an entire bar signal for judging is the best.

In the waveform check section 3, the bar GCR signals applied from the signal extracting section 2 are first fed to a filter section 30, an absolute value section 34 and a delay section 36.

In the filter section 30, a ghost component which intermixes into a picture signal coming before the picture signal to be tuned in each bar signal is made less and amplitude values of a remaining component corresponding to the color burst signal are squared by a square section 31. The squared amplitude values are accumulated in an accumulator section 32 while a reference timing signal has a low level as shown in FIG. 1(d). The accumulated values are fed to a first judge section 33, to be compared with a reference value. If all of the former is not greater than the latter, the color burst signal is judged to be canceled and a "high" signal is then output by the first judge section 33.

Next, the bar GCR signals made to pass through the absolute value section 34 are applied to a first level judge section 35 where the levels of the bar GCR signals are judged while a reference timing signal has a low level shown in FIG. 1(g), that covers the signal portions immediately after the leading edges of the GCR signals of correct timing.

The bar GCR signals made to pass through the absolute value section 34 are also applied to a second level judge section 37 where the level of the bar GCR signals are judged while the reference timing signal has a low level shown in FIG. 1(h), that covers signal portions just before the trailing edges of the GCR signals of correct timing.

The first and second level judge sections 35 and 37 generate "high" signals if the bar GCR signals have correct levels and time intervals.

The output signals of the first judge section 33 and the first and second level judge sections 35 and 37 are applied to a second judge section 38 (AND gate) which generates a judgement signal if the three "high" signals arrive. The bar GCR signals are judged to be correct if all the sections 33, 35 and 37 generate "high" signals.

When the second judge section 38 judges the bar GCR signals to be correct, the bar GCR signals, whose timing is delayed due to signal processing by the filter section 30 and absolute value section 34 to the second judge section 38 is compensated by the delay section 36, are applied to a waveform converter section 4 through a gate section 39.

The waveform of each of the bar GCR signals is reformed to meet that of a reference signal, which is generated by a reference signal generator section 5, in a waveform converter section 4. In a subtraction section 6, the reference signal is subtracted from the output signal of the waveform converter section 4 to generate the error signal s.

An evaluation function is obtained in a weighting function calculator section 7 based on the error signal ε. The following are examples of the evaluation function:

$$E = \int_{t_2}^{t_1} \epsilon^2(t) dt$$

$$E = \int_{t_2}^{t_1} |\epsilon(t)| dt$$

where, error s(t)=s(t)−d(t),
s(t) . . . an extracted signal waveform and
d(t) . . . a reference signal waveform The evaluation function E and the minimum value Emin of an already obtained evaluation function which has been stored in a minimum value store section 8 multiplied by a constant magnification α greater than 1, are compared with each other in a comparator section 9.

A magnification setting section 10 sets a magnification β, based on the result of the comparison of the section 9. A tap-gain renew section 11 renews the tap-gain of the transversal filter of the filter section 1. A tap-gain TG(n) to be obtained at the present time is given by TG(n)=TG(n−1)−β×ε, where TG(n−1) is the tap-gain which was set at the last time. If E is greater than α×Emin, the magnification β is set at zero and the tap-gain is remained unchanged. The renewed tap-gain is applied to the filter section 1, so that the characteristic of the filter section 1 is varied so as to better the removal of the ghost component intermixing into the picture signal. The picture signal in which the ghost component is removed is then outputted through the output terminal 13.

Accordingly, even if bar signals are extracted from the received picture signal, out of a correct timing, judgment as to whether the bar signals are correct GCR signals can be made effectively for accurate removal of ghost components.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for removing a ghost component which disturbs a picture signal by means of a ghost canceling reference signal included therein, including:

ghost removing filter means for removing the ghost component;

signal extracting means for extracting the reference signal from the picture signal by canceling a color burst signal and other signal components included therein except the reference signal;

waveform judging means for judging whether the extracted reference signal has a specific waveform;

signal inspection means for inspecting disturbance of the extracted reference signal suffered from the ghost component, if the extracted reference signal is judged to have the specific waveform; and characteristic varying means, responsive to the inspection, for varying filtering characteristics of the filter means, wherein the waveform judging means comprises:

level judging means for judging whether the extracted reference signal has a specific level in a reference time interval;

signal judging means for judging whether the color burst signal is canceled in the extracted reference signal;

signal outputting means for outputting a judgement signal if the extracted reference signal is judged to have the specific level in the reference time interval and the color burst signal is judged to be canceled; and gate means, responsive to the judge signal, for applying the extracted reference signal to the signal inspection means.

2. An apparatus according to claim 1, wherein the level judging means comprises:

absolute value taking means for taking absolute values of the extracted reference signal;

first level judging means for judging levels of the absolute value-taken reference signal during a time period thereof after a leading edge thereof; and second level judging means for judging levels of the absolute value-taken reference signal during a time period thereof before a trailing edge thereof.

3. An apparatus according to claim 1, wherein the signal judging means comprises:

calculation means for calculating a square sum of amplitudes of the extracted reference signal during a time period where the color burst signal originally exists in the picture signal; and signal comparing means for comparing the square sum with a reference value, and if the former is smaller than the latter, outputting a color burst judge signal expressing that the color burst signal is canceled to the signal outputting means.

4. An apparatus according to the claim 1, further comprising time delay compensation means for compensating the extracted reference signal with respect to a period of time which corresponds to a time delay due to the extracted signal passing through the level judging means and signal judging means, and applying the time-compensated extracted reference signal to the gate means.

* * * * *